United States Patent
Kumar

(10) Patent No.: US 10,990,492 B2
(45) Date of Patent: Apr. 27, 2021

(54) AUTOMATED TERMINAL PROBLEM IDENTIFICATION AND RESOLUTION

(71) Applicant: NCR Corporation, Atlanta, GA (US)

(72) Inventor: Surisetty Pradeep Kumar, Telangana (IN)

(73) Assignee: NCR Corporation, Atlanta, GA (US)

( * ) Notice: Subject to any disclaimer, the term of this patent is extended or adjusted under 35 U.S.C. 154(b) by 212 days.

(21) Appl. No.: 15/938,867

(22) Filed: Mar. 28, 2018

(65) Prior Publication Data
US 2019/0303258 A1 Oct. 3, 2019

(51) Int. Cl.
| | | |
|---|---|---|
| G06F 11/00 | (2006.01) | |
| G06F 11/22 | (2006.01) | |
| G07F 19/00 | (2006.01) | |
| G06F 11/34 | (2006.01) | |

(52) U.S. Cl.
CPC ...... *G06F 11/2257* (2013.01); *G06F 11/3495* (2013.01); *G07F 19/209* (2013.01)

(58) Field of Classification Search
CPC .............. G06F 11/3089; G06F 11/321; G06F 11/3409; G06F 11/3447; G06F 11/3452; G06F 11/3495
See application file for complete search history.

(56) References Cited

U.S. PATENT DOCUMENTS

| | | | | |
|---|---|---|---|---|
| 7,600,671 B2* | 10/2009 | Forrest | .................... | G07F 9/026 235/376 |
| 7,861,120 B2* | 12/2010 | Cui | ..................... | G06F 11/0748 714/38.1 |
| 8,161,330 B1* | 4/2012 | Vannatter | ................. | G07F 9/026 235/380 |
| 8,245,076 B2* | 8/2012 | Schindel, Jr. | ......... | G07F 19/206 235/379 |
| 8,738,973 B1* | 5/2014 | Vannatter | ............... | G06Q 10/00 714/47.1 |
| 8,746,551 B2* | 6/2014 | Bryant | .................. | G06F 11/008 235/379 |
| 9,026,856 B2* | 5/2015 | Hecox | ................. | G06F 11/0793 714/38.1 |
| 9,177,272 B2* | 11/2015 | Kennedy | ................ | G06Q 10/06 |
| 9,672,252 B2* | 6/2017 | Landry | ............... | G06F 11/0706 |
| 9,697,068 B2* | 7/2017 | Bello | .................. | G06F 11/3466 |
| 2013/0185592 A1* | 7/2013 | Fleming | ............. | G06F 11/0709 714/37 |
| 2014/0156357 A1* | 6/2014 | Green | ............. | G06Q 10/06395 705/7.41 |
| 2017/0091019 A1* | 3/2017 | Li | ........................ | G06F 11/0709 |
| 2017/0161610 A1* | 6/2017 | Kim | .................... | G06F 16/3329 |
| 2017/0337560 A1* | 11/2017 | Wang | .................... | G06F 3/0482 |

(Continued)

*Primary Examiner* — Elmira Mehrmanesh

(74) *Attorney, Agent, or Firm* — Schwegman, Lundberg & Woessner

(57) ABSTRACT

A transaction terminals reports information regarding operation of terminal to a server-based analyzer. The analyzer labels the information and normalizes the labeled information into a model format. The analyzer reports the model format to a problem identifier/resolver. The problem identifier/resolver identifies a closest likely problem and a resolution for that closest likely problem based on the labeled information in the model format and reports the likely problem and resolution back to the analyzer for resolution on the transaction terminal.

20 Claims, 4 Drawing Sheets

(56) References Cited

U.S. PATENT DOCUMENTS

2018/0203755 A1\* 7/2018 Das ..................... G06F 11/0709
2018/0285750 A1\* 10/2018 Purushothaman .. H04L 43/0823
2019/0163594 A1\* 5/2019 Hayden .................. G06N 20/00

\* cited by examiner

AUTOMATED TERMINAL PROBLEM IDENTIFICATION AND RESOLUTION

BACKGROUND

Retail environments include many different types of transaction terminals, such as: Customer Self-Service (CSS) terminals (e.g., Self-Service Terminals (SSTs), Automated Teller Machines (ATMS), kiosks, Kitchen Production System (KPS) terminals, travel kiosks, grocery kiosks), etc.), Point-Of-Sale (POS) terminals, and fuel pump terminals. Each of these transaction terminals may include different configurations and hardware and software resources, which means that many instances of terminal builds are managed by each retail site or environment.

Significant human resources are needed to maintain these transaction terminals in proper working condition for servicing customers at each retail site. Furthermore, the information provided to service personal during initial installs, updates, and/or scheduled or unscheduled maintenance activities from the terminals is cryptic and difficult to understand, especially for relatively new or junior service technicians.

Additionally, when a particular hardware or software resource problem is resolved for a particular problem, the maintenance and support staff are relied upon for filling out forms or logs that another service personnel and presumably use in similar problem scenario. This assumes that the original technician sufficiently fills out the forms or logs, which typically does not occur, and this assumes that there is a sufficient searching mechanism or tool that can assist subsequent technicians is quickly finding the original technician's notes; such tools are not uniformly provided and are generally considered cumbersome and difficult to use by the service technicians. Plus, the problem history documentation is usually confined to a single retailer's site and not readily available across multiple sites of the retailer or across different sites of different retailers.

As a result, much problem identification and resolution remains ad hoc, proprietary, and are not fully leveraged with knowledge of the service technicians and software developers.

SUMMARY

In various embodiments, methods and a system for automated terminal problem identification and resolution are provided.

According to an embodiment, a method for automated terminal problem identification and resolution is provided. Specially, a machine learning algorithm is trained on reported information from a transaction terminal. Labeled information is received for a current operational state of the transaction terminal. The machine learning algorithm is processed with the labeled information and receiving a portion of the reported information as output from the machine learning algorithm. Finally, the portion of the reported information is provided as a potential identified problem and a resolution to the potential identified problem for the transaction terminal.

DETAILED DESCRIPTION

Figure 1:
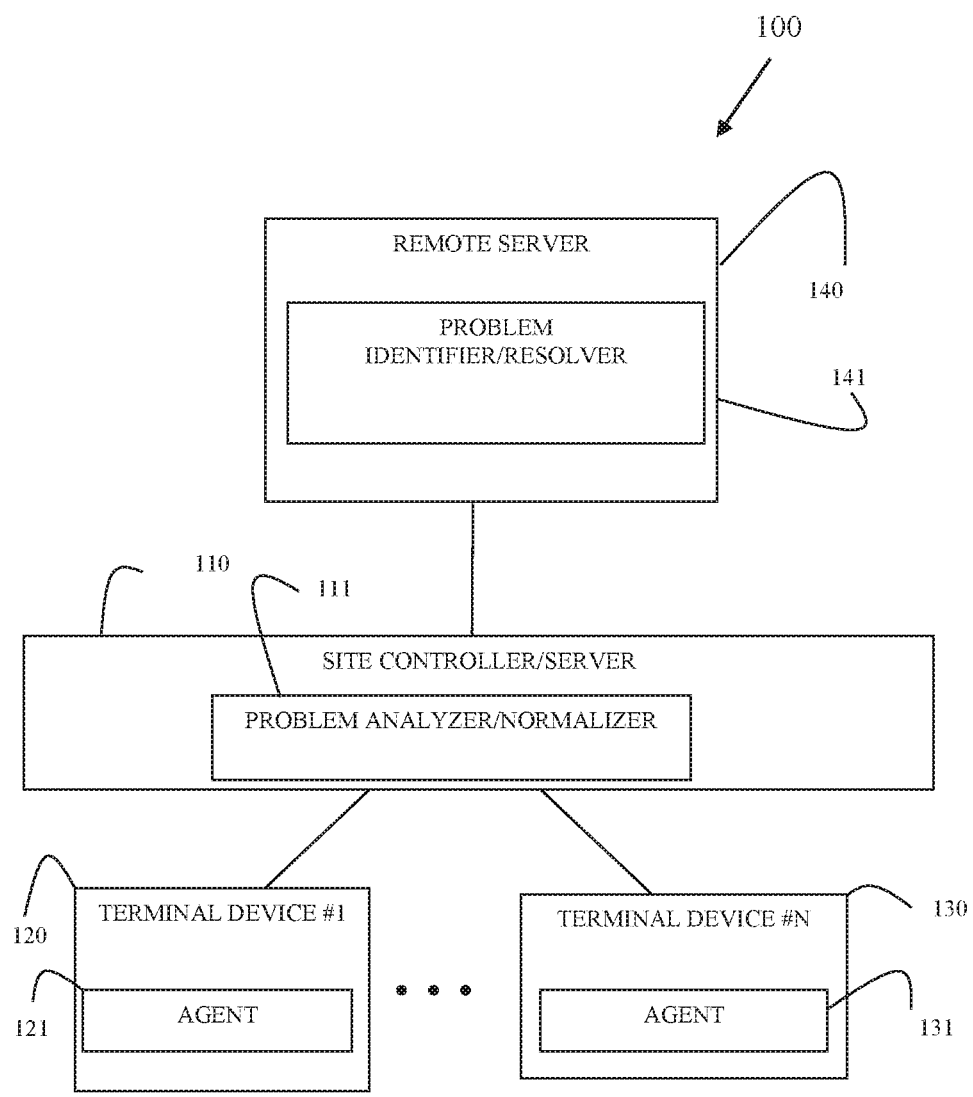
FIG. 1 is a diagram illustrating components of an automated problem identification and resolution system, according to an example embodiment.

FIG. 1 is a diagram illustrating components of an automated problem identification and resolution system 100, according to an example embodiment. It is to be noted that the system 100 is shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of automated terminal problem identification and resolution, presented herein and below.

Furthermore, the techniques and the systems presented herein and below (for automated terminal problem identification and resolution) may include all or some combination of the components shown with the system 100. The methods are programmed as executable instructions in memory and/or non-transitory computer-readable storage media and executed on one or more processors associated with the components/devices.

Specifically, the system 100 includes a site controller/server 100 (hereinafter "server 100"). The server 100 includes one or more hardware processors, memory and non-transitory computer-readable storage. The processor(s) of the server 100 execute computer instructions representing a problem analyzer/normalizer 111. The server is networked (through wired and/or wireless connections to a plurality of transaction terminals devices (1 to N) 120 and 130 (herein after just "device(s) and/or 120 and 130"). The server 100 and the devices 120 and 130 representing a managed site of assets for an enterprise.

Each device 120 and 130 includes one or more processors, memory, and non-transitory computer-readable storage. The processors of each device 120 and 130 execute computer instructions representing an agent 121 and 131.

The system 100 also includes a remote server 140 that includes a processor, memory, and non-transitory computer-readable storage. The server's processor executes computer instructions representing a problem identifier/resolver 141.

The agents 121 and 131 report: logs, metrics, service actions, transaction actions, error events, error conditions, operational states, media levels, and the like to the problem analyzer/normalizer 111 over wired or wireless connections between the devices 120 and 130 to the server 110. The agents 121 and 131 may also be configured to receive executable instructions or scripts from the problem analyzer/normalizer that the agents 121 and 131 process for execution on the one or more processors of the devices 120 and 130.

The problem analyzer/normalizer 111 labels the information reported from the agents 121 and 131 into types of information for errors, metrics, service actions, error conditions, states, media levels, transaction actions, etc. In an embodiment, the problem analyzer/normalizer 111 parses any logs received from the agents 121 and 131 and labels each entry of log with a particular type.

The labeled types and the values obtained from the reported information provided by agents 120 and 130 is then augmented with data fields that identify the terminal devices 120 and 130 that provided the reporting information and a resource configuration build version number (that is linked to a specific resource (hardware and software) configuration).

Service actions are associated with scheduled maintenance, unscheduled maintenance, media replenishment, and/or problem resolution on the terminals 120 and 130. Such, that any problem ticket generated for a terminal is linked to specific service actions. This problem ticket and related service actions taking for resolving the problem ticket is also labeled by the problem analyzer/normalizer 111 with a problem ticket identifier in the reported information. The problem analyzer/normalizer 111 also labels the service actions for scheduled maintenance, unscheduled maintenance, and media replenishment.

The labeled reported information is sent over a wired or wireless connection to the problem identifier/resolver 141 as normalized reporting information received from the agents 120 and 130. A data store is maintained of the normalized reporting information on the remote server 140 or on a different server that is accessible to the problem identifier/resolver 141.

When a resolution to a problem or maintenance ticket is closed by a service technician, the problem analyzer/normalizer 111 receives notice of the ticket being closed (indicating that a problem was resolved). The service actions that were noted when the ticket was opened are all liked together in the reporting information by the ticket number. A message is sent along with any additional noted labeled service actions from the problem analyzer/normalizer 111 to the problem identifier/resolver 141.

The problem identifier/resolver 141 processes machine learning to correlate the labeled reporting information (metrics, service actions, error conditions, events, state, configuration build version, etc.) and messages indicating resolution of tickets from the data store over time. The correlations can be weighted in the machine learning process performed by the problem identifier/resolver 141.

In this manner, the problem identifier/resolver 141 is continually learning and training on the devices 120 and 130 for the site managed by the problem analyzer/normalizer 111 and improving on the accuracy of the correlations and the weights for the correlations.

A user-facing interface to the problem identifier/resolver 141 may also permit the linkage of computer instructions or scripts that are designed to be executed on the devices 120 and 130 for resolving specific problems (performance or error conditions experienced by the devices 120 and 13). The problem identifier/resolver 141 maintains these scripts and computer instructions in association with the problem types and error conditions. These scripts can also be specific to the configuration or build version rather than a specific device 120 or 130.

Once initially trained, as reporting information is fed in real time in the labeled format from the problem analyzer/normalizer 111 to the problem identifier/resolver 141 for storage in the data store (knowledge store), the problem identifier/resolver searches the existing knowledge store with that information and performs the correlation and weighting processing on the dynamically received labeled reporting information. This can be a scoring mechanism in which the new reporting information is scored and compared against scorings maintained for previous noted problems with previous resolutions. If the newly scored reporting information is within a threshold range of an existing score for previous noted problems, the problem identifier/resolver 141 identifies a match from searching the knowledge store and automatically retrieves the service actions taken associated with resolving the match previously noted problem. This may include obtaining any linked computer instructions or scripts for automated execution. The matched service actions and any linked instructions/scripts are sent as an alert to the problem analyzer/normalizer 111. The problem analyzer/normalizer 111 may then engage the appropriate agent (120 or 130, the agent from which the reporting information originated) and provide the instructions/scripts for automated execution and resolution (when such instructions/scripts are available). Alternatively, the problem analyzer/normalizer 111 may send the service actions provided by the problem identifier/resolver 141 to a device operated and registered to a service technician assigned to service the device 120 or 130 for resolution on the device 120 or 130.

It is noted that a problem ticket does not have to be open when the problem identifier/resolver 141 identifies a problem with resources of a device 120 or 130 because of the scoring-based approach with learned correlations, the problem identifier/resolver 141 can predict the problem before it occurs based on the reporting information (such as reported performance metrics and state for the device 120 or 130). This can be done through the threshold comparison of the scored real-time reported information and the matched problem from the knowledge store based on the threshold. The threshold itself can be adjusted by the problem identifier/resolver 141 over time based on reported resolutions for problems.

In this manner, the problem identifier/resolver 141 is proactive and predictive of problems that have not occur but based on computer correlations and scoring, the problem identifier/resolver 141 believes (based on threshold comparison) will likely occur in the further.

It is also noted that the identified problem can be associated with media replenishment before media (such as ink, paper, currency, currency of a particular denomination, coins, coins of a particular denomination, receipt printer print head, etc.) actually needs replenishment in a particular peripheral device of the device 120 or 130 (receipt printer, currency cassette, coin cassette, etc.).

Furthermore, the problem identification can be related to a peripheral device of the device 120 or 130 (such as peripherals associated with a receipt printer, a card reader, a cash dispenser, and encrypted PIN pad, a touchscreen, an Near-Filed Communication (NFC) reader, a recycle bin, and imaging device, etc.).

The user-facing interface to the problem identifier/resolver 141 can also be used for user reporting. For example, even though threshold values maintained by the problem identifier/resolver 141 is dynamically adjusted during machine learning, the user may want to provide a user-defined threshold to have the problem identifier/resolver 141 generate a report of potential problems for particular devices 120 and 130. This may be useful when service technicians are slow with work and want to proactively perform maintenance operations on the devices 120 and 130. Standard reporting can also be used through the interface to get user-defined summaries and histories for any of the reporting information or correlations, weights, and resolutions maintained in the knowledge store by the problem identifier/resolver 141.

Furthermore, when the problem identifier/resolver 141 identifies a potential problem and a resolution, if such problem was not actually what occurred with a device 120 or 130 and/or if the resolution was incorrect, such information can be provided back to the problem identifier/resolver 141 through the problem analyzer/normalizer 111 and/or through the user facing interface to the problem identifier/resolver 141. This creates a dynamic feedback look for the ongoing machine learning of the problem identifier/resolver 141. This same feedback when the problem identifier/resolver 141 is correct in identifying a problem and/or resolution can be fed back as input to the machine learning. This allows the problem identifier/resolver 141 to continually and dynamically in real time adjust correlations and weights to improve the accuracy in the problem identifier/resolver 141 proactively identifying and predicting problems and providing the correct resolutions.

In an embodiment, the problem analyzer/normalizer 111 can request that the problem identifier/resolver 141 provide a closet available solution to a set of reporting information provided in the labeled and normalized format from the problem analyzer/normalizer 111. This overrides any scoring-based threshold comparison and the problem identifier/resolver 141 dynamically returns the highest matching score for potential problem identification and resolution back to the problem analyzer/normalizer 111. This closest solution can also be obtained through the user-facing interface to the problem identifier/resolver 141 by entering known reporting information into fields of the interface with the problem identifier/resolver 141 returning the highest matching score for a potential problem identification and resolution back to the interface for displaying to the user.

In an embodiment, the problem identifier/resolver 141 does not user a score threshold comparison for predictive problem identification and resolution; rather, the problem identifier/resolver 141 is configured to always return a closest problem identification and resolution based on a highest matching score to the reporting information provided to the problem identifier/resolver 141.

In an embodiment, the problem identifier/resolver 141 is configured to either provide a score threshold comparison or the closest matching score.

In an embodiment, the problem identifier/resolver 141 can be instructed to dynamically switch between score threshold comparison and the closest matching score processing approaches.

As one example scenario between reporting information from the problem analyzer 111 and the problem identifier/resolver 141 consider the following: Device 120 reports installation failure of Remote POS (RPOS) image build attempt on the device 120, the problem analyzer/normalizer 111 normalizes and labels the reported information into a model recognized by the problem identifier/resolver 141 and the additional labels/features are added so that the problem identifier/resolver 141 can parse the same. i.e., for the problem: "Installation failed: "Install Products Action Configuration (Installing new RPOS version to the site controller) returned exit code -3." The labels/features which are added along with the error are: Issue (Application Hang/Application Crash/Installation Fail), decoded error code, Exception Details (if needed), Time of the Error, Number of Times the same issue occurrence etc. This data is then parsed by the problem identifier/resolver 141 on the remote server 140 and the datasets initially provided would be taken and validated. i.e., in this instance, Installation Failed, decoded error code and Exception details are validated with the data sets and closest solution is returned back to the problem analyzer/normalizer 111, which would be a message or updating the files/configuration automatically (through a provided script) so that the next time the problem (issue) won't repeat for any subsequent attempt at the Remote POS image build.

This is but one example and is provided for illustration only as the situations can vary and be much more complex.

In an embodiment, the devices 120 and 130 are one or more of: a CSS terminal, a POS terminal, a SST, an ATM, a kiosk, a fuel pump kiosk, a KPS terminal, and a travel kiosk.

In an embodiment, the problem analyzer/normalizer 111 can be executed on a single device 120 or 130, such as when a site lacks a server 110 and includes a single device 120 or 130.

In an embodiment, the remote server 140 is a collection of servers that operate as a single cloud processing environment as the remote server 140.

The above-discussed embodiments and other embodiments are now discussed with reference to the FIGS. 2-4.

Figure 2:
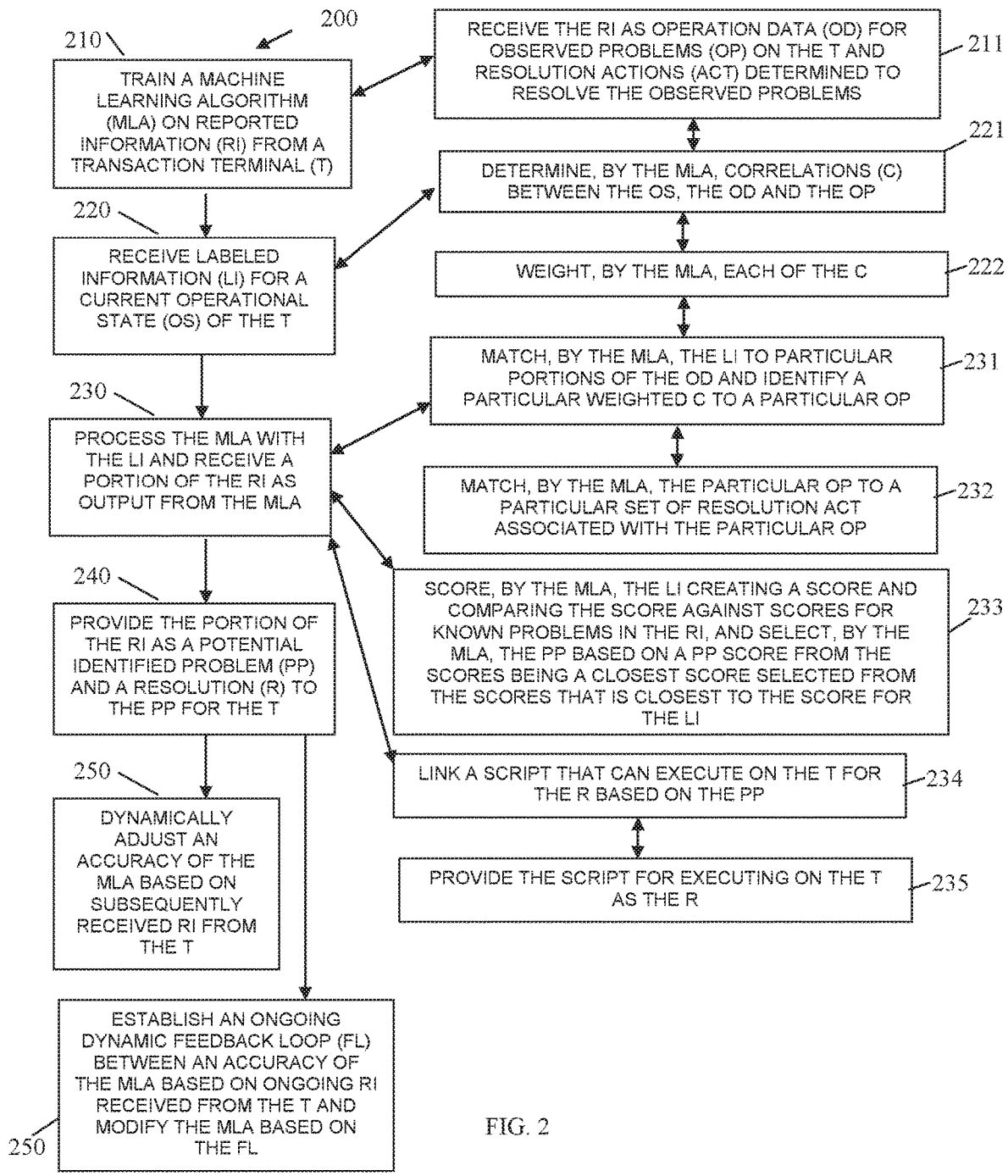
FIG. 2 is a diagram of a method for automated terminal problem identification and resolution, according to an example embodiment.

FIG. 2 is a diagram of a method 200 for automated terminal problem identification and resolution, according to an example embodiment. The software module(s) that implements the method 200 is referred to as a "predictive problem identifier/resolver." The predictive problem identifier/resolver is implemented as executable instructions programmed and residing within memory and/or a non-transitory computer-readable (processor-readable) storage medium and executed by one or more processors of a device. The processor(s) of the device that executes the predictive problem identifier/resolver are specifically configured and programmed to process the predictive problem identifier/resolver. The predictive problem identifier/resolver may have access to a network during its processing. The network can be wired, wireless, or a combination of wired and wireless.

In an embodiment, the device that executes the predictive problem identifier/resolver is the remote server 140.

In an embodiment, the device that executes the predictive problem identifier/resolver is a cloud processing environment (cloud).

In an embodiment, the predictive problem identifier/resolver is the problem identifier/resolver 141.

At 210, the predictive problem identifier/resolver trains a machine learning algorithm on reported information from a transaction terminal. The reported information can include performance metrics, state, configuration build version, error conditions, error events, maintenance or support actions taken on the transaction terminal, and any of the reported information discussed above with the FIG. 1.

In an embodiment, at 211, the predictive problem identifier/resolver receives the reported information as operation data for observed problems on the transaction terminal and resolution actions determined to have resolved the observed problems (observed conditions and outcomes that successfully addressed the observed conditions on the transaction terminal).

At 220, the predictive problem identifier/resolver receives labeled information for a current operation state of the transaction terminal.

In an embodiment of 211 and 220, at 221, the machine learning algorithm determines correlations between the operational state, the operational data, and the observed problems.

In an embodiment of 221 and at 222, the machine learning algorithm weights each of the correlations.

At 230, the predictive problem identifier/resolver processes the machine learning algorithm with the labeled information and receives a portion of the reported information as output from the machine learning algorithm.

In an embodiment of 222 and 230, at 231, the machine learning algorithm matches the labeled information to particular portions of the operational data and identifies a particular weighted correlation to a particular observed problem.

In an embodiment of 231 and at 232, the machine learning algorithm matches the particular observed problem to a particular set of resolution actions associated with the particular observed problem.

In an embodiment, at 233, the machine learning algorithm, scores the labeled information creating a score. The score is compared against scores for known problems in the reported information. The potential problem is selected based on a potential problem score from the scores. The potential problem score is a closest score from the scores that is closest to the score for the labeled information.

In an embodiment, at 234, the predictive problem identifier/resolver links a script that can execute on the transaction terminal for the resolution based on the potential problem.

In an embodiment of 234 and at 235, the predictive problem identifier/resolver provides the script for automated execution on the transaction terminal as the resolution.

At 240, the predictive problem identifier/resolver provides the portion of the reported information as a potential identified problem and a resolution to the potential identified problem for the transaction terminal.

According to an embodiment, at 250, the predictive problem identifier/resolver dynamically adjusts an accuracy of the machine learning algorithm based on subsequently received reported information from the transaction terminal.

In an embodiment, at 260, the predictive problem identifier/resolver establishes an ongoing dynamic feedback loop between an accuracy of the machine learning algorithm based on ongoing reported information received from the transaction terminal and the predictive problem identifier/resolver modifies the machine learning algorithm based on dynamic feedback loop.

The accuracy in embodiments 250 and 260 refer to the accuracy in the machine learning algorithm in correctly identifying potential or likely problems on the transaction terminal based on subsequently provided outcomes for previous decisions made by the machine learning algorithm.

It is to be noted that although the predictive problem identifier/resolver was described for automatic problem identification and resolution on a single transaction terminal, the predictive problem identifier/resolver works on a plurality of transaction terminals simultaneously as was discussed above with the FIG. 1. Therefore, the single transaction terminal was discussed for ease of comprehension and illustration and embodiments of the predictive problem identifier/resolver are not limited to a single transaction terminal.

Figure 3:
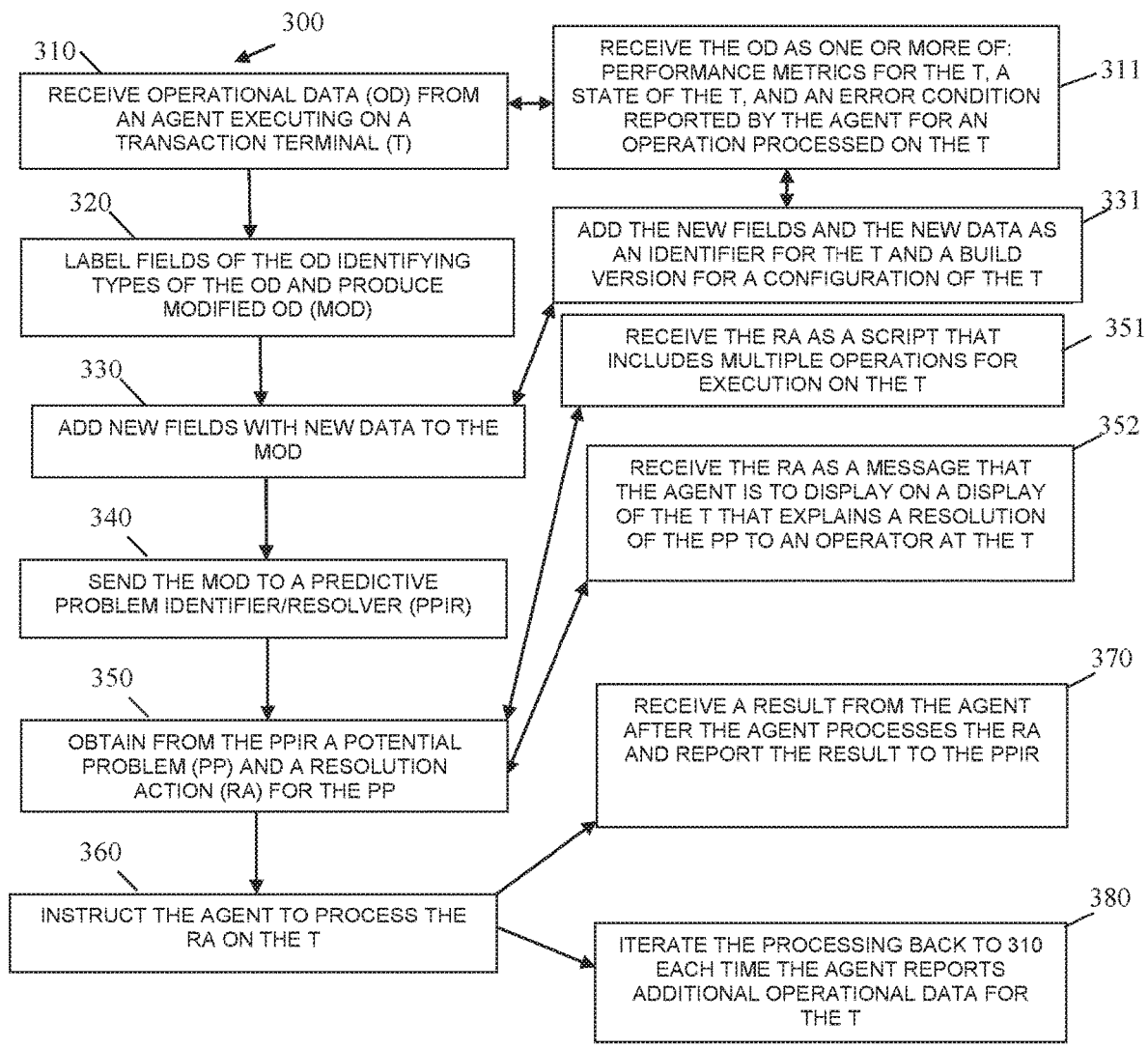
FIG. 3 is a diagram of another method for automated terminal problem identification and resolution, according to an example embodiment.

FIG. 3 is a diagram of another method 300 for automated terminal problem identification and resolution, according to an example embodiment. The software module(s) that implements the method 300 is referred to as a "problem analyzer." The problem analyzer is implemented as executable instructions programmed and residing within memory and/or a non-transitory computer-readable (processor-readable) storage medium and executed by one or more processors of a hardware device. The hardware processors that execute the problem analyzer are specifically configured and programmed to process the problem analyzer. The problem analyzer may have access to one or more networks during its processing. Each network can be wired, wireless, or a combination of wired and wireless.

The problem analyzer interacts with the method 200.

In an embodiment, the device that executes the problem analyzer is the server 110.

In an embodiment, the device that executes the problem analyzer is a transaction terminal. In an embodiment, the transaction terminal is one of the devices 120 and 130. In an embodiment, the transaction terminal is one of: a CSS terminal, a KPS terminal, a SST, an ATM, a kiosk, and a fuel pump kiosk.

In an embodiment, the problem analyzer is the problem analyzer/normalizer 111.

At 310, the problem analyzer receives operational data from an agent execution on a transaction terminal. In an embodiment, the agent is one of agent 121 and agent 131.

In an embodiment, at 311, the problem analyzer receives the operational data as one or more of: performance metrics for the transaction terminal, a state of the transaction terminal, an error conditions reported by the agent for an operation processed on the transaction terminal, etc. In an embodiment, the operational data is the reported information discussed above in the FIGS. 1-2.

At 320, the problem analyzer labels fields of the operational data identifying types of the operational data, and the problem analyzer produces modified operational data from the labeled operational data.

At 330, the problem analyzer adds new fields with new data to the modified operational data.

In an embodiment of 311 and 330, at 331, the problem analyzer adds the new fields and new data as an identifier for the transaction terminal and a build version for a configuration of the transaction terminal.

At 340, the problem analyzer sends the modified operational data to a predictive identifier/resolver. In an embodiment, the predictive identifier/resolver is the problem identifier/resolver 141. In an embodiment, the predictive identifier/resolver is the method 200.

At 350, the problem analyzer obtains from the predictive identifier/resolver a potential problem and a resolution action for the potential problem.

In an embodiment, at 351, the problem analyzer receives the resolution action as a script that includes multiple operations for execution on the transaction terminal.

In an embodiment, at 352, the problem analyzer receives the resolution action as a message that the agent is to display on a display of the transaction terminal that explains a resolution of the potential problem to an operator at the transaction terminal.

At 360, the problem analyzer instructs the agent to process the resolution action on the transaction terminal.

According to an embodiment, at 370, the problem analyzer receives a result from the agent after the agent processes the resolution action. The problem analyzer then reports the result back to the predicative problem identifier/resolver.

In an embodiment, at 380, the problem analyzer iterates the processing back at 31 each time the agent reports additional operational data for the transaction terminal. Again, the operational data can be any of the reported information discussed herein.

It is again to be noted that the problem analyzer was described based on its interactions with a single agent on a single transaction terminal for purposes of illustration and convenience. That is, the problem analyzer can interact and perform the above-noted processing on a plurality of transaction terminals managed at a site as was discussed above with the FIG. 1 and the plurality of transaction terminals 120 and 130.

Figure 4:
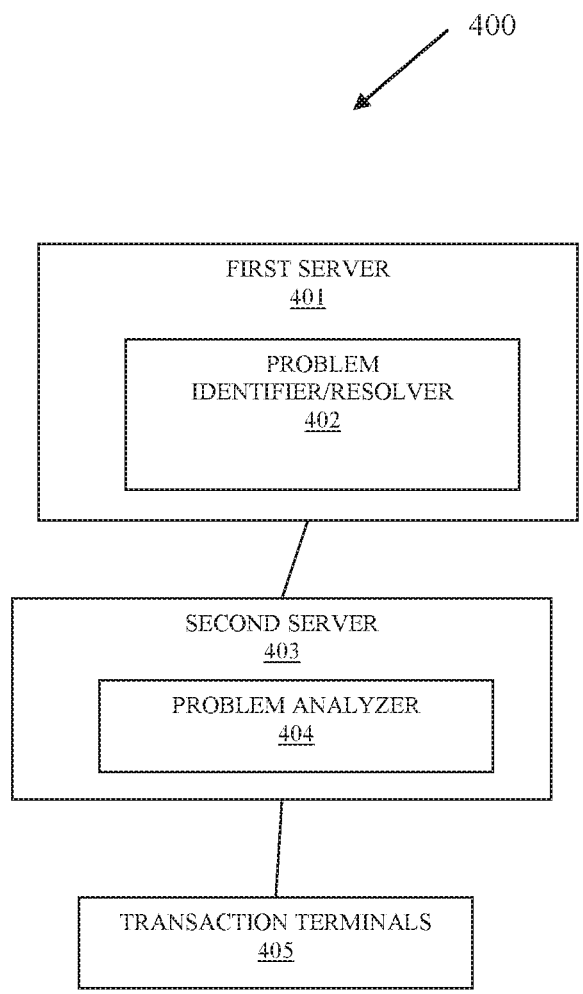
FIG. 4 is a diagram of another system for automated terminal problem identification and resolution, according to an example embodiment.

FIG. 4 is a diagram of another system 400 for automated terminal problem identification and resolution, according to an example embodiment. Some components of the system 400 are programmed and reside within memory and/or a non-transitory computer-readable medium and execute on one or more processors of multiple devices of the system 400. The system 400 communicates over one or more networks, which can be wired, wireless, or a combination of wired and wireless.

In an embodiment, the system 400 is the system 100.

In an embodiment, the system 400 implements, among other things, the processing discussed in the FIGS. 1-3.

The system 400 includes a first server 401 having a problem identifier/resolver 402, second server 403 having a problem analyzer 404, and a plurality of transaction terminals 405.

In an embodiment, the identifier/resolver 402 is one of, all, or some combination of: the problem identifier/resolver 141 and the method 200.

In an embodiment, the problem analyzer 404 is one of, all, or some combination of: the problem analyzer/normalizer 111 and the method 300.

In an embodiment, the first server 401 is the server 140.

In an embodiment, the first server 401 is a cloud processing environment (cloud).

In an embodiment, the second server 403 is the site controller/server 110.

In an embodiment, the transaction terminals 405 include one or more: CSS terminals, KPS terminals, SSTs, POS terminals, ATMs, kiosks, and fuel pump kiosks.

The problem identifier/resolver 402 is configured to: i) receive reporting information from the problem analyzer 404, ii) process a machine learning algorithm against the reporting information to identify a potential problem and a resolution for a particular transaction terminal 405 based on the reporting information, iii) provide the potential problem and the resolution back to the problem analyzer 404, and iv) update or modify the machine learning algorithm based on a reported result for the resolution provided by the problem analyzer 404.

The problem analyzer 404 is configured to: a) obtain operational data from the transaction terminals 405, b) label and add new data to some of the operation and data and provided the labeled and new data to the problem identifier/resolver 402 as the reporting information for the particular transaction terminal 405, c) receive potential problem and the resolution back from the problem identifier/resolver 402, d) cause one or more actions to be processed on the particular transaction terminal 405 responsive to the resolution, and e) provide the reported result produced from processing the one or more actions back to the problem identifier/resolver 402.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   training, by executable instructions that execute on a processor of a server from a non-transitory computer-readable storage medium, a machine learning algorithm on reported information from a transaction terminal;
   receiving, by the executable instructions, labeled information for a current operational state of the transaction terminal, wherein receiving further includes labeling agent information that is reported by an agent of the transaction terminal as the labeled information, wherein labeling the agent information further includes labeling types of information within the labeled information, the types of information are associated with terminal errors, terminal metrics, terminal service actions, terminal error conditions, terminal states, terminal media labels, and terminal transaction actions;
   processing, by the executable instructions, the machine learning algorithm with the labeled information and receiving a portion of the reported information as output from the machine learning algorithm;
   providing, by the executable instructions, the portion of the reported information as a potential identified problem and a resolution to the potential identified problem for the transaction terminal;
   obtaining, by the executable instructions, a user-defined threshold from a user-facing interface;
   comparing, by the executable instructions, the user-defined threshold against the reported information; and
   generating, by the executable instructions, a maintenance report comprising maintenance operations needed by the transaction terminal for proactive maintenance.

2. The method of claim 1, wherein training further includes receiving the reported information as operational data for observed problems on the transaction terminal and resolution actions determined to resolve the observed problems.

3. The method of claim 2, wherein receiving further includes determining, by the machine learning algorithm, correlations between the operational state, the operational data, and the observed problems.

4. The method of claim 3, wherein determining further includes, weighting, by the machine learning algorithm, each of the correlations.

5. The method of claim 4, wherein processing further includes matching, by the machine learning algorithm the labeled information to particular portions of the operational data and identifying a particular weighted correlation to a particular observed problem.

6. The method of claim 5, wherein matching further includes matching, by the machine learning algorithm, the particular observed problem to a particular set of resolution actions associated with the particular observed problem.

7. The method of claim 1, wherein processing further includes scoring, by the machine learning algorithm, the labeled information creating a score and comparing score against scores for known problems in the reporting information, and selecting, by the machine learning algorithm, the potential identified problem based on a particular potential identified problem score from the scores being a closest score selected from the scores that is closest to the score for the labeled information.

8. The method of claim 1, wherein providing further includes linking a script that can execute on transaction terminal for the resolution based on the potential identified problem.

9. The method of claim 8, wherein linking further includes providing the script for executing on the transaction terminal as the resolution.

10. The method of claim 1 further comprising, dynamically adjusting, by the executable instructions, an accuracy of the machine learning algorithm based on subsequently received reporting information from the transaction terminal.

11. The method of claim 1 further comprising, establishing, by the executable instructions, an ongoing dynamic feedback loop between an accuracy of the machine learning algorithm based on ongoing reporting information received from the transaction terminal and modifying machine learning algorithm based on the ongoing dynamic feedback loop.

12. A method, comprising:
receiving, by executable instructions that are executed by a processor of a server from a non-transitory computer-readable storage medium, operational data reported from an agent that is executed on a transaction terminal;
labeling, by the executable instructions, fields of the operational data identifying types of the operational data producing modified operational data, wherein labeling further includes labeling the types of the operational data that are associated with terminal errors, terminal metrics, terminal service actions, terminal error conditions, terminal states, terminal media labels, and terminal transaction actions;
adding, by the executable instructions, new fields with new data to the modified operational data;
sending, by the executable instructions, the modified operational data to a predictive problem identifier/resolver;
obtaining, by the executable instructions and from the predictive problem identifier/resolver a potential problem and a resolution action for the potential problem; and
instructing, by the executable instructions, the agent to process the resolution action on the transaction terminal;
acquiring, by the executable instructions, a user-defined threshold from a user-facing interface;
comparing, by the executable instructions, the user-defined threshold against the modified operational data; and
generating, by the executable instructions, a maintenance report comprising maintenance operations needed by the transaction terminal for proactive maintenance.

13. The method of claim 12, wherein receiving further includes receiving the operation data as one or more of: performance metrics for the transaction terminal, a state of the transaction terminal, and an error condition reported by the agent for an operation processed on the transaction terminal.

14. The method of claim 13, wherein adding further includes adding the new fields and new data as an identifier for the transaction terminal and a build version for a configuration of the transaction terminal.

15. The method of claim 12, wherein obtaining further includes receiving the resolution action as a script that includes multiple operations for execution on the transaction terminal.

16. The method of claim 12, wherein obtaining further includes receiving the resolution action as a message that the agent is to display on a display of the transaction terminal that explains a resolution of the potential problem to an operator at the transaction terminal.

17. The method of claim 15 further comprising, receiving a result from the agent after the agent processes the resolution action and reporting the result to the predictive problem identifier/resolver.

18. The method of claim 15 further comprising, iterating the method each time the agent reports additional operational data for the transaction terminal.

19. A system, comprising:
a first server having a hardware processor that executes computer instructions representing a problem identifier/resolver;
a second server having a hardware processor that executes computer instructions representing a problem analyzer; and
a plurality of transaction terminals;
wherein the problem identifier/resolver is configured to: i) receive reporting information from the problem analyzer, ii) process a machine learning algorithm against the reporting information to identify a potential problem and a resolution for a particular transaction terminal based on the reporting information, iii) provide the potential problem and the resolution back to the problem analyzer, and iv) update or modify the machine learning algorithm based on a reported result for the resolution provided by the problem analyzer;
wherein the problem analyzer is configured to: a) obtain operational data from the transaction terminals, b) label and add new data to some of the operational data and provide the labeled and new data to the problem identifier/resolver as the reporting information for the particular transaction terminal by labeling the operational data with types of information associated with terminal errors, terminal metrics, terminal service actions, terminal error conditions, terminal states, terminal media labels, and terminal transaction actions, c) receive potential problem and the resolution back from the problem identifier/resolver, d) cause one or more actions to be processed on the particular transaction terminal responsive to the resolution, e) provide the reported result produced from processing the one or more actions back to the problem identifier/resolver; f) obtain a user-defined threshold from a user-facing interface, g) compare the user-defined threshold against the corresponding reporting information for the corresponding transaction terminals, and h) generate a maintenance report comprising maintenance operations needed by one or more of the transaction terminals for proactive maintenance.

20. The system of claim 19, wherein the first server is a cloud processing environment and the transaction terminals are one or more of: Customer Self-Service terminals, Kitchen Production System terminals, Self-Service Terminals, Automated Teller Machines, a kiosk, a Point-Of-Sale terminal, and a fuel pump kiosk.

* * * * *